(12) United States Patent
Yamamoto (10) Patent No.: US 6,930,166 B2
(45) Date of Patent: Aug. 16, 2005

(54) POLYMERIC COMPOUND (75) Inventor: Takakazu Yamamoto, Yokohama (JP)

(73) Assignee: Japan Science and Technology Agency, Saitama (JP)

( * ) Notice: Subject to any disclaimer, the term of this patent is extended or adjusted under 35 U.S.C. 154(b) by 234 days.

(21) Appl. No.: 10/250,401

(22) PCT Filed: Jan. 9, 2001

(86) PCT No.: PCT/JP01/00045

§ 371 (c)(1), (2), (4) Date: Jun. 30, 2003

(87) PCT Pub. No.: WO02/055580

PCT Pub. Date: Jul. 18, 2002

(65) Prior Publication Data

US 2004/0030092 A1 Feb. 12, 2004

(51) Int. Cl.$^7$ .............................................. C08G 61/10
(52) U.S. Cl. ....................................... 528/395; 528/397
(58) Field of Search ................................ 528/395, 397

(56) References Cited

FOREIGN PATENT DOCUMENTS

JP          9-309945       * 12/1997

* cited by examiner

Primary Examiner—Duc Truong
(74) Attorney, Agent, or Firm—Sherman & Shalloway (57) ABSTRACT A polymer compound which is a polyphenylene co-condensation polymer consisting substantially of par-aphenylene group and metaphenylene group and improved in forming ability and functions, wherein the ratio of metaphenylene group is in the range of 60 to 95%.

4 Claims, 7 Drawing Sheets

POLYMERIC COMPOUND

FIELD OF THE INVENTION

The present invention relates to unsubstituted polyphenylene polymer materials which is soluble in organic solvent, have heat-resistance and luminescence, have photo.electron function and can be a carbonizing materials.

BACKGROUND OF THE INVENTION

Up to the present, polyparaphenylene having a structure of following compound 1, compound 1

(n is a repeating unit number) is well known as a compound which has heat-resistance and displays electric conductivity by adding an oxidizing agent (electron acceptor) and a reducing agent (electron donor) [refer to Synthetic Metals, Vol.1. p307(1979), Kyoritsu Shuppan "Electric conductive polymer" p4 (1987), Kyoritsu Shuppan "Polymer battery" p15 (1990)]. Further, in J. Phys. Chem. Vol.100, p12631 (1996), Advanced Materials, vol.4, p36 (1992) or in others, there is a description that said polymer is a substance which displays photoluminescence. Still more, there are many reports disclosing that said polymer is a substance which is electrochemically active showing electrochromizm [J. Phys. Chem. Vol.100, p12631 (1996)] or disclosing that said polymer can be a starting material to obtain a carbonizing materials by carbonization such as calcination [J. Mater. Res. Vol.13, p2023 (1998)].

Further, regarding the synthesis example of polymetaphenylene having a structure of compound 2, compound 2

(m is a repeating unit number) is already reported in Bull. Chem. Soc. Jpn., Vol. 51, p2091 (1973) and reports that said compound indicates fluorescence.

While, the conventional method for preparation of polyphenylenes are mentioned as follows.

As the method to obtain said polyparaphenylene or polymetaphenylene, there is a report relating a synthesis method using 1,4-2 substituted benzene or 1,3-2 substituted benzene as a starting material [a. JP Pat. Laid-Open Publication 52-154900, b. Bull, Chem, Soc. Jpn., Vol.51, p2091 (1978), c. Macromol, Chem. Rapid Commun. Vol16, p761 (1987), d. Macromolecules, Vol.25, p1214 (1992), e. Makromol Chem. Phys., Vol. 198, p341 (1997)].

Examples of said method can be indicated by following schema 1 or schema 2.

schema 1 schema 2

(wherein, X is halogen, M is reductive metal or metal compound such as Mg, Zn or zero value nickel complex, n and m are same meaning to chemical formulae 1 and 2). This reaction is a method to dehalogenizing polycondense the starting material by M (for example, MgX(2) is generated simultaneously) and the compound of nickel, palladium or iron are as a catalyst (refer to above mentioned documents a and b).

Further, a reaction which uses a reducing agent such as NaH or hydrazine, and uses a nickel compound or palladium as a catalyst, further uses a lower valency compound of nickel or palladium generated by the reaction of the catalyst with said reducing agent as M in above mentioned schema 1 and 2 is already reported [refer to above mentioned document e, and f. Bull, Chem, Soc. Jpn., Vol. 72, p621 (1999))].

In the case of dehalogenizing polymerization using above mentioned M, there is a conception that halogen is remaining at the end of polymer as shown in chemical formula 3, formula 3 or end group represented by chemical formula 4 formula 4 is converted to chemical formula 5 formula 5 by a reaction with methanol or water during a treatment process of a polymer compound, which is already reported too (refer to mentioned document b). Further, there is also a report disclosing that when this polymerization reaction is carried out in tetrahydrofuran, oxysotetramethylene group generated by cleavaging reaction of tetrahydrofuran is took in into a polymer chain (refer to mentioned document b).

These end groups or the oxysotetramethylene group which is took in into a polymer chain, it is not necessary to remove by after treatment, if they do not affect largely to the physical property such as heat-resistance or luminescence and to the use for the carbonization. The small taking in amount of oxysotetramethylene group, has rather good effect to improve the solubility of a polymer compound.

Still further, there is a report disclosing that a coupling reaction which uses a boron compound or a tin compound is usable as a synthesis of poly (arylene) such as polyparaphenylene (refer to mentioned document f). In this method for polymerization, for example, the methods for polymer synthesis according to following schemata 3, 4 and 5 can be mentioned.

In above schemata, n is a repeating unit, and in above polymerization methods, a palladium compound can be added as a catalyst at need. Furthermore, in an ordinary reaction, it is possible to obtain polyparaphenylene using 1,4-substututed benzene possessing an eliminable substitution group. Likewise, it is possible to obtain polyparaphenylene using 1,3-substututed benzene. Still more, when needs are arisen, it is possible to carry out the polymerization reaction in the condition where small amount of 2,5-dibromoprydine or 1,3,5-tribromobenzene are existing together with, and the unit originated to these halogen compounds can be took in into a polymer as a part.

However, said polyphenylene polymer has a problem of insoluble and infusible because of it's rigid linear structure, further has a problem that the application to a materials for photo.electron function is difficult because of lacking of molding ability and excipiting ability.

The subject of the present invention is to obtain phenylene polymer which solve the problem of lack of molding ability.

For the purpose to accomplish the subject of the present invention, various trials are carried out, and among the trials to co-condense base materials for conventional phenylene polymers by various blending amount, the following fact is found out and the subject of the present invention is accomplished. That is, a polymer which contains 40–95 mol % of meta-phenylene unit, desirably a polymer which contains 60–90 mol % of meta-phenylene unit, more desirably a polymer which contains 80–90 mol % of meta-phenylene unit has a characteristic to be soluble in an organic solvent, which is an unexpected effect from a homopolymer.

DISCLOSURE OF THE INVENTION

The present invention is a polymer compound substantially comprising an unsubstituted paraphenylene group and an unsubstituted metaphenylene group, wherein the ratio of the metaphenylene group is in the limit of 60–95%. Desirably, said polymer compound is soluble in organic solvent, more desirably, the molecular weight of said polymer compound is in the limit of 600–40000.

THE BEST EMBODIMENT TO CARRY OUT THE INVENTION

The present invention will be illustrated more in detail. A. Synthesis of the Polymer Compound of the Present Invention The polymer compound of the present invention can be obtained based on the method for synthesis of said paraphenylene and metaphenylene, namely, by polycondensation reaction using 1,4-substituted benzene and 1,3-substituted benzene as the starting materials.

Substantially, for example, can be obtained by following schemata 6 and 7 under the presence of catalyst.

(wherein, X is halogen, R is alkyl group and n and m are repeating unit number) In said reaction, it is possible to obtain a copolymer having blocking ability by contriving the adding order of said two monomers.

There is no limitation in sequence of a paraphenylene group and a metaphenylene group in the polymer compound obtained as above, however, it is desirable that the polymer is to be a randomized copolymer because the lower crystallized polymer is advantageous for the purpose to improve the solubility. Concretely, it can be accomplished by investigating adding order of monomers, reacting temperature and a kind of catalyst.

B. Since almost of the polymer compounds of the present invention are soluble in organic compound, it can be applied to the conventional method to produce various molded products such as film which uses polymer solution for a casting method or an extruding method of the solution to a coagulation solution composed of poor solvent.

C. Usually, for the purpose to obtain a carbon material, in particular, to obtain a film shape carbon material which has high addition value, it is reported that it is necessary to adjust the physical property of the film to be provided to the carbonization.

Further, it is already known that the polymer compound characterizing that the component which is lost during the carbonizing process, and not containing oxygen or sulfur which affects the carbonization process is desirable. As the concrete example, the use of a film material formed from coal pitch or polyacrylonitrile is well known.

The characteristics of the polymer compound of the present invention meet to the mentioned requirement. That is, the polymer compound of the present invention has good efficiency to the carbonization and the molding from the solution is possible and the molding process is easy, therefore, the quality of the obtained film is excellent. Therefore, by the carbonization of said film, it is expected that the film shape carbon material can be obtained. The film shape carbon material is useful as the electrode material for a secondary electrode.

D. Regarding the molecular weight of the polymer compound of the present invention, there is no limitation, however, it is desirable that the molecular weight is larger than 600 to obtain the intensity necessary to the polymer compound of the present invention.

E. The polymer compound of the present invention is usable as the polymer to form a charge-transfer complex as well as polyparaphenylene or polymetaphenylene material having characteristics of an electric conductive organic polymer as an electron donor which composes a charge-transfer complex to obtain an organic semiconductor or organic charge-transfer material by combining with various electron acceptor such as tetracyanoquinodimethane, tetracyanoethylene or iodide.

F. Further, the polymer compound of the present invention can observe fluorescence characteristic at the region from soft ultraviolet to short wave length visible light (blue region) by irradiation of ultraviolet ray, and is useful as a fluorescence material.

Example 1

The reaction between mixture of paradibromobenzene and metadibromobenzene (total amount is 5.9 g, 25 mmol) with magnesium (0.61 g, 25 mmol) is carried out in tetrahydrofuran anhydride (35 mL) under argon gas flow at the room temperature.

The reaction in tetrahydrofuran is continued for 2 hours, and magnesium is vanished. Br—$C_6H_4$MgBr—p, Br—$C_6H_4$MgBr—m, p—$C_6H_4$(MgBr)$_2$, m—$C_6H_4$(MgBr)$_2$ are considered to be generated at this time (refer to mentioned document b).

Then, dichloro(2,2'-bipyridine) nickel (II) (25 mg, 0.087 mmol) is added to said tetrahydrofuran solution as a polymerization catalyst, polymerized at the room temperature for 1 hour further, polymerized at the temperature of 75° C. under argon gas flow, and the reacting solution containing polymer compound is obtained. Said recting solution is poured into 250 mL ethanol with constant stirring and the precipitate is recovered by filtration. The obtained powder is rinsed by dilute hydrochloric acid, water and ethanol, dried by a vacuum desiccator and the copolymer is obtained.

Said method for polymerization is in accordance with the method for synthesis of paraphenylene which is already reported (refer to mentioned documents a and b).

By said method, the copolymer mentioned in Table 1 is obtained. As the Comparative Example, polyparaphenylene (PPP) and polymetaphenylene (PMP) obtained by same method are also summarized in Table 1.

TABLE 1

| Polymer compound a | P:M b | Polymerization time c | Yield (%) |
|---|---|---|---|
| PPP | 10:0 | 4 | 97 |
| P6/4 | 6:4 | 4 | 76 |
| P5/5 | 5:5 | 4 | 64 |
| P4/6 | 4:6 | 4 | 61 |
| P3/7 | 3:7 | 24 | 56 |
| P2/8-1 | 2:8 | 4 | 39 |
| P2/8-2 | 2:8 | 10 | 38 |
| P2/8-3 | 2:8 | 24 | 67 |
| P2/8-4 | 2:8 | 40 | 67 |
| P1/9 | 1:9 | 24 | 50 |
| PMP | 0:10 | 4 | 49 | a: abbreviation of the obtained polymer compound
b: material monomer
c: reaction time at 75° C.
P = p-$C_6H_4Br_2$, M = m-$C_6H_4Br_2$
PPP = polyparaphenylene
PMP = polymetaphenylene In Table 1, Characteristics of Polymer:

The IR spectrum of PPP obtained by the method disclosed in document b, has a strong absorption at 1000 cm$^{-1}$ which is originated to the paraphenylene group (considered mainly caused by in-plane deformation vibration). The IR spectrum of PMP obtained by the method disclosed in document b, has a strong absorption at 1595 cm$^{-1}$ which is originated to the metaphenylene group (considered mainly caused by cyclic vibration). Further, it become clear from the intensity of the absorption, the ratio of mole absorption modulus of absorption by the paraphenylene group of approximately 1000 cm$^{-1}$ and absorption by the metaphenylene group of approximately 1595 cm$^{-1}$ is about 1:1.

All of the IR spectrums of copolymers shown in Table 1 of the present invention display two absorptions at 1000 cm$^{-1}$ and 1595 cm$^{-1}$ which are characterized to a paraphenylene group and a metaphenylene group, therefore it clearly indicates that the polymer compound is a copolymer.

Figure 1:
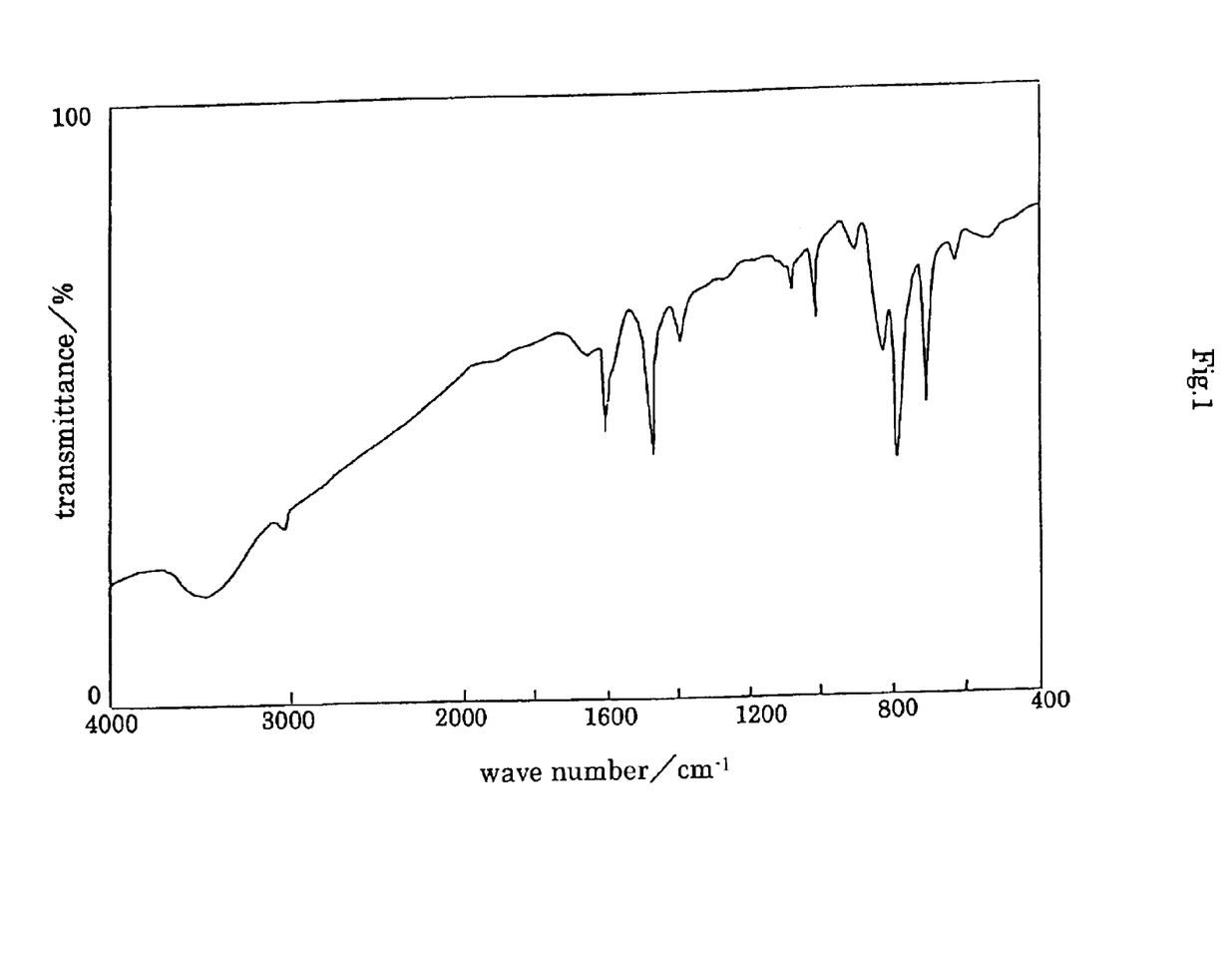
FIG. 1 shows the infrared spectrum (transmittance %) of polymer whose ratio of paraphenylene and metaphenylene is 5:5 (in tables indicated by P5/5).

Assuming the ratio of molar absorption coefficient by a paraphenylene group and a metaphenylene group of said PPP and PMP can be applied to a copolymer, the ratio of paraphenylene group:metaphenylene group obtained from the IR spectrum (FIGS. 1 and 2) of copolymers of P5/5 and P3/7 in Table 1 are 55:45 and 65:35. Concerning the accuracy of IR analysis, therefore, it becomes clear that paradibromobenzene and metadibromobenzene display almost same reactivity at polymerization.

Figure 2:
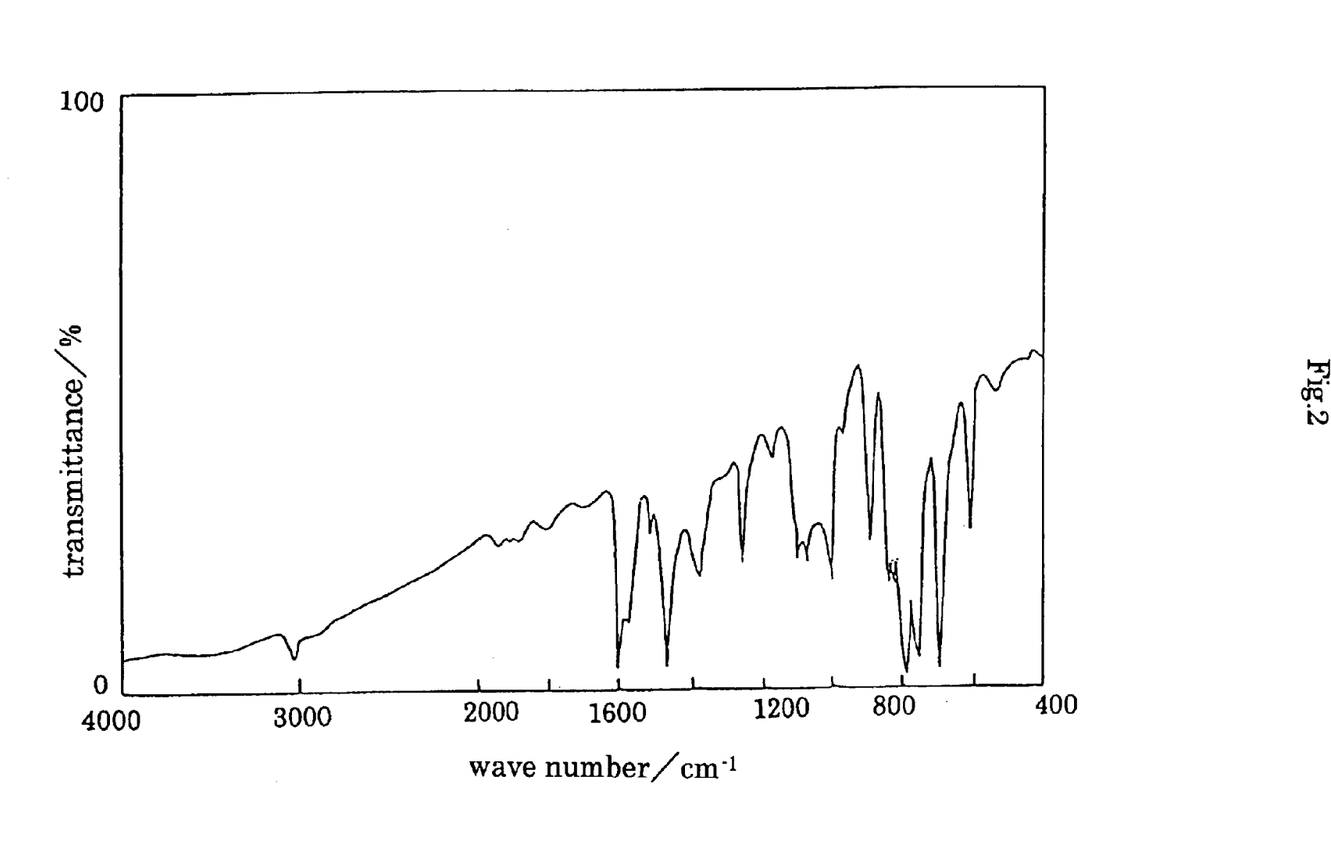
FIG. 2 shows the infrared spectrum (transmittance %) of polymer whose ratio of paraphenylene and metaphenylene is 3:7 (P3/7).
Figure 3:
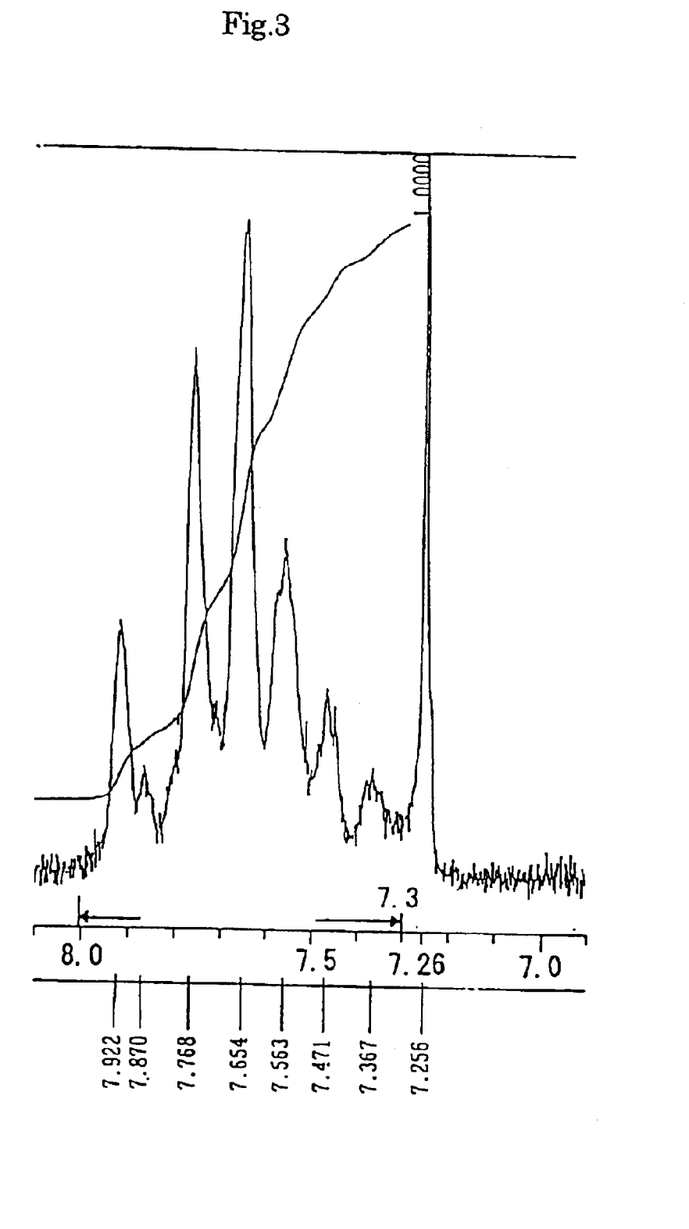
FIG. 3 shows the $^1$H-NMR (in CDCl$_3$, 400 MHz) of polymer whose ratio of paraphenylene and metaphenylene is 3:7 (P3/7).
Figure 4:
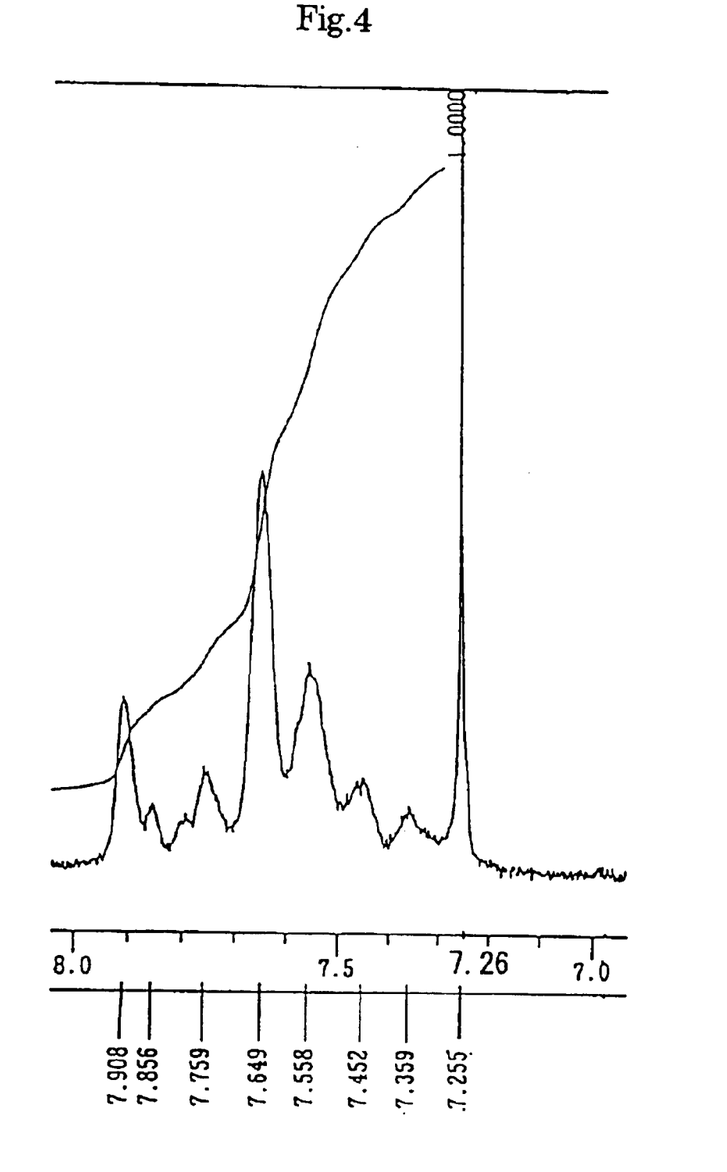
FIG. 4 shows the $^1$H-NMR (in CDCl$_3$, 400 MHz) of polymer whose ratio of paraphenylene and metaphenylene is 1:9 (P1/9).

While the specimen for IR spectrum shown in FIG. 2 partially contains silicone grease and shows absorption at 1260 cm$^{-1}$.

$^1$H-NMR (400 MHz in CDCl$_3$) spectrums of Table 1 are shown in Tables 3 and 4. The sharp absorption of δ 7.26 is based on CHCl$_3$ impurity in CDCl$_3$. Further, a particular absorption pattern of an aromatic hydrocarbon compound containing more than two kinds of paraphenylene group or metaphenylene group at δ 7.3–8.0 (for example, 206M, 1613M, 5083M, 661M spectrum of $^1$H-NMR date book) is shown. By the comparison with $^1$H-NMR spectrum of various aromatic hydrocarbon compounds (for example, the spectrum in said $^1$H-NMR date book), the absorption of approximately δ 7.7–8.0 can be guessed to be depended on isolated C—H bond of metaphenylene group, however, since the absorption pattern is very complicated, the sufficient component analysis was impossible.

Every polymer compounds in Table 1 are stable till 300° C. in thermogravimetric analysis under nitrogen gas flow. Further, at 850° C., the residue weight of these polymer compounds are approximately 50%. Still further, these polymer compounds becomes black at 850° C., and it is confirmed that these polymer compounds are carbonized.

Figure 5:
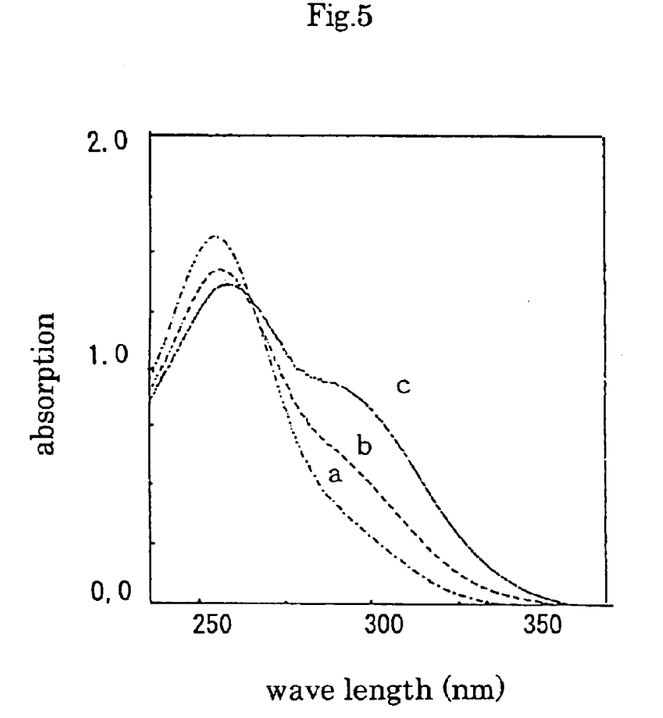
FIG. 5 shows the ultraviolet absorption spectrum polymers whose ratio of paraphenylene and metaphenylene are respectively 1:9 (P1/9), 2:8 (P2/8-3) and 3:7 (P3/7).

In FIG. 5, ultraviolet-visible light absorption spectrums of P1/9, P2/8-3, P3/7 (a, b, c) are shown. The ratio of paraphenylene group is increasing by a, b, c order the large unit whose effective π conjugated chain increases and it is clear that the absorption of 280–320nm around is increasing.

Example 2

The solubility of synthesized copolymers to various solvents are shown in Table 2.

TABLE 2

| Polymer compound: solvent | THF | DMF | DMSO | CHCl$_3$ |
| --- | --- | --- | --- | --- |
| PPP | X | X | X | X |
| P9/1 | X | X | X | X |
| P8/2 | X | X | X | X |
| P7/3 | X | X | X | X |
| P6/4 | X | X | X | X |
| P5/5 | X | X | X | X |
| P4/6 | Δ | Δ | Δ | X |
| P3/7 | Δ | Δ | Δ | ○ |
| P2/8 | ○ | ○ | ○ | ○ |
| P1/9 | ○ | ○ | ○ | ○ |
| PMP | X | X | X | X |

Figure 6:
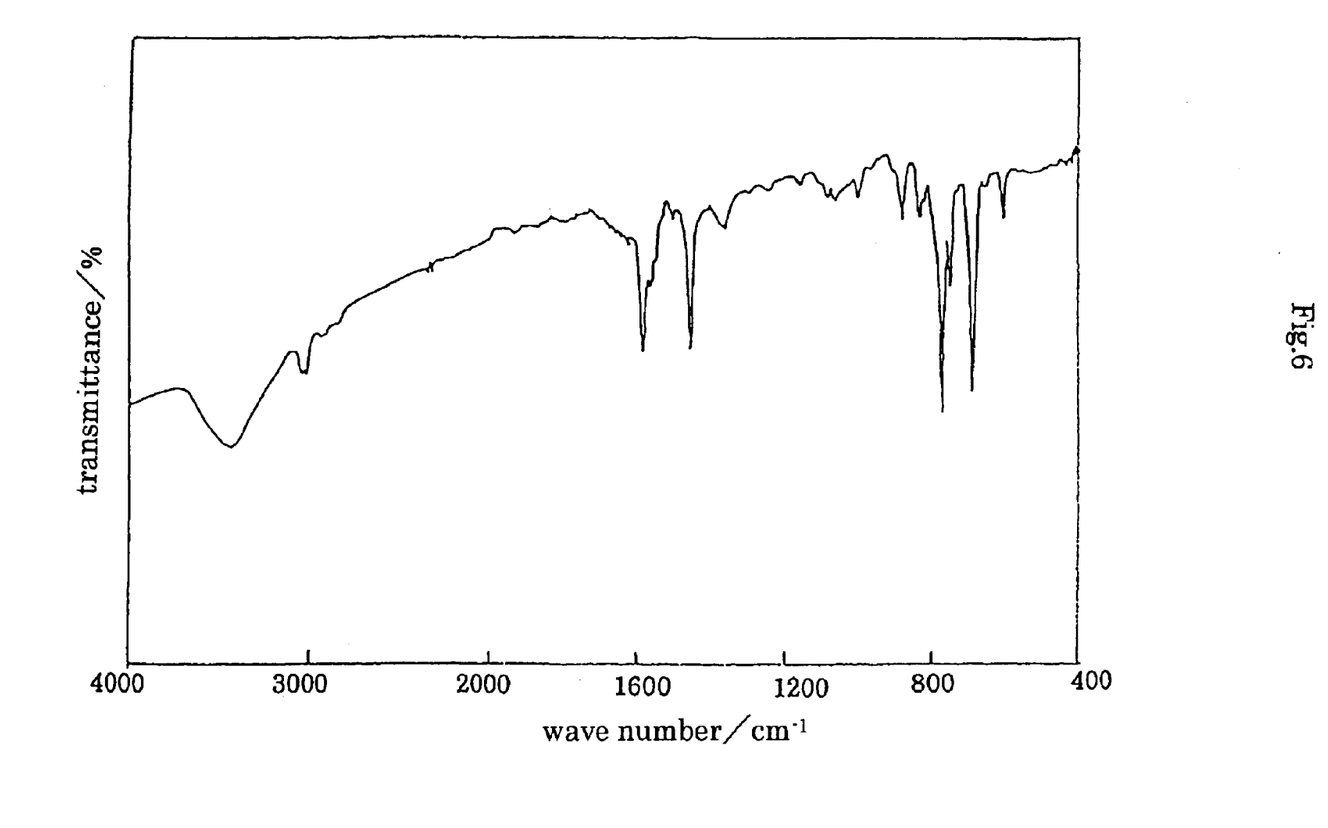
FIG. 6 shows the infrared spectrum of polymer whose ratio of paraphenylene and metaphenylene is 2:8 and molecular weight is in Table 3 is indicated as "P2/8-1".

X: insoluble,
Δ: partially soluble, mostly suspended,
○: soluble (solubility test: 10 mg/mL)
From P2/8 to P2/8-4 show same solubility.
In the Table,
THF: tetrahydrofuran,
DMF: dimethylformamide,
DMSO: dimethyl sulfoxide
Infrared spectrum of P2/8-1 is shown in FIG. 6.

It is understood that the polymer containing 40–91 mol % of metaphenylene unit, further, the polymer containing 80–90 mol % of metaphenylene unit is superior in solubility.

The preparation of film is carried out by casting THF solution or chloroform solution on a glass substrate and by air drying THF or chloroform. The obtained film is a smooth and transparent film.

While, since the polymer compound obtained by the polymerization of Example 1 have possibility to remain a parabromophenyl group or a metabromephenyl group at the end [refer to above mentioned document a and b, and same subject is also reported in Macromolecules vol. 28, p4577 (1995)], the polymer compound is dispersed in tetrahydrofuran and treated by LiAlH$_4$, and the polymer compound not containing bromine is obtained.

End treatment of the obtained polymer and the characteristics of it. For example, P2/8-2 and P2/8-4 are reacted with LiAlH$_4$ and debrominated as shown in following schemata 8 and 9, schema 8 schema 9 and debrominated polymer (indicated by P2/8-2-H, P2/8-4-H) are obtained.

And the elemental analysis value of P2/8-2-H is carbon: 89.87% and hydrogen: 5.75%, while that of P2/8-4-H is carbon: 93.02% and hydrogen: 5.75%. The mole ratio of each polymer compounds are approximately coincidental with the calculated value as polyphenylene. The reason why the analytical value of carbon in P2/8-2-H is slightly lower than the calculated value when infinite chain length polyphenylene is assumed (carbon: 94.70%, hydrogen: 5.30%) can be considered to be caused by flame retardancy, partially contained water and mixing of small amount of inorganic compound. Since P2/8-2-H and P2/8-4-H obtained as above relatively shows same solubility to the original polymer compound P2/8-2 and P2/8-4, it becomes clear that the end bromine does not give any effect to the solubility.

Example 3

Molecular Weight of Polymer

Regarding the polymer compound which displays DMF solubility, number averaged molecular weight (hereinafter shortened to Mn) and weight averaged molecular weight (hereinafter shortened to Mw) are measured according to a gel permeation chromatography (GPC) method. For the measurement, HLC-8120GPC, which is a product of TOSO Co., Ltd. is used, as a detector UV-8020 (detecting wave length is 300 nm) is used and DMF which contains 0.006M LiBr is used as a developing solvent. As the results, Mn and Mw of Table 3 by polystyrene conversion are obtained.

TABLE 3

Molecular weight of polymer compound

| Polymer compound | Mn | Mw |
|---|---|---|
| P2/8-1 | 1270 | 2150 |
| P2/8-2 | 1310 | 2000 |
| P2/8-3 | 2590 | 2980 |
| P2/8-4 | 2300 | 2780 |
| P2/8-2-H | 1330 | 2040 |
| P1/9 | 1290 | 2980 |

The GPC curve of P2/8-1 and P2/8-4 are relatively showing the distribution of molecular weight 230–17500 and 660–7310 and indicates that the polymer compounds of this region are soluble in DMF.

Example 4
Fluorescence Characteristics of Copolymer

Figure 7:
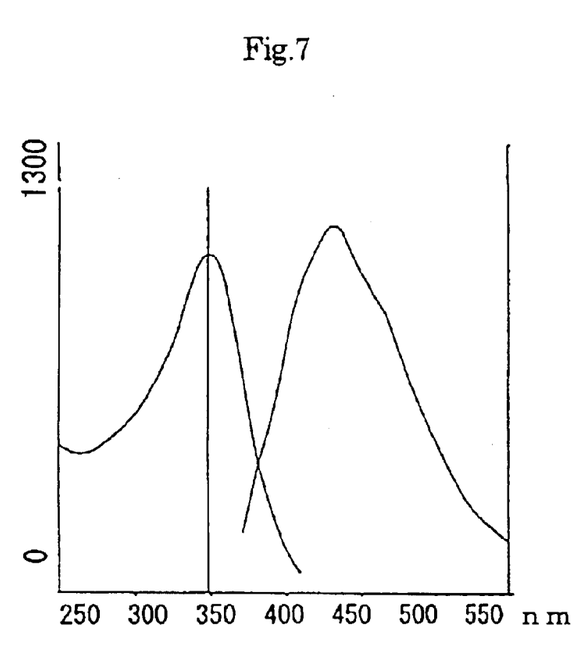
FIG. 7 shows the fluorescence characteristic of polymer whose ratio of paraphenylene and metaphenylene is 2:8 and molecular weight is in Table 3 is indicated as "P2/8-3".

Copolymer P2/8-3 is dissolved in chloroform and cast on a non-fluorescent glass plate, the solvent is removed and the film of P2/8-3 is obtained. The fluorescence of the film is measured, and the result shows that the film indicates strong fluorescent having a luminous maximum at 432 nm (FIG. 7). And it becomes clear that the excitation spectrum of it shows the peak at 350 nm. Still more, it become clear that the polymer compound of Table 1 indicates fluorescent in solid and solution condition under the irradiation of ultra violet ray.

The fluorescent spectrum of P3/7 in THF solution has a fluorescent peak at 370 nm around and the excitation spectrum shows the peak at 250 nm-300 nm around.

Fluorescence Characteristics of Vacuum Deposition Film

PPP, P6/4, P5/5, P4/6, P2/8-1 and PMP are vacuum deposited on a quartz glass plate and a thin film is formed.

The fluorescent intensity of these thin films are compared, and the relative intensive ration is 1:5.5:7:7:1:0.5. From this result, it becomes clear that the isolated copolymer of paraphenylene and metaphenylene shows strong fluorescence, that is, the characteristic which is particular to a copolymer.

Example 5

Paradibromobenzene (1.18 g, 5.0 mmol) and metadibromobenzene (4.72 g, 20 mmol) are reacted with 0.61 g (25 mmol) of magnesium in the mixed solution of tetrahydrofuran anhydride (10 mL) and dibutyl ether (50 mL) under the argon gas flow. By refluxing, reacted for 12 hours, and after magnesium is disappeared, dichloro(2,2-bipyridine)nickel (II) (25 mg) is added as a catalyst. The polymerization reaction is carried out by refluxing condition under argon gas flow for 5 hours, then the generated polymer compound is recovered by same method to the Example 1. The yield is 720 mg (yield % is 38%). The reason why the yield % is low, is considered because a part of polymer is soluble in ethanol. Said polymer compound is soluble in N,N'-dimethylformamide, chloroform and tetrahydrofuran and 0.2 g/dL N,N-dimethylformamide solution indicates 0.10 dLg$^{-1}$ η sp/c (η sp=specific viscosity). And the chloroform solution of polymer compound indicates fluorescent having peaks at 356 nm and 372 nm under the irradiation of 260 nm ultraviolet ray, and the yield of it is 16%.

Example 6

Except further adding 1,3,5-tribromobenzene (1.25 mmol) besides paradibromobenzene (1.18 g, 5.0 mmol) and metadibromobenzene (4.72 g, 20 mmol), by the same condition to the synthesis of P2/8-3 in Example 1 (but polymerization time is 20 hours) polymerization reaction is carried out and obtained polymer compound by 70% yield. This polymer compound is also soluble in N,N'-dimethylformamide, chloroform and tetrahydrofuran. The molecular weight of this polymer is confirmed as 21000 by light scattering method (measured in N,N'-dimethylformamide).

Example 7

10 mg of polymer compound obtained in Example 5 is dissolved in 5 mL of dimethylformamide, and 20 μL of the solution is collected, coated on a platinum electrode of 1 cm×1 cm and air dried. The yellowish thin film of polymer obtained as above is dipped into acetonitrile containing 0.10M of (NEt$_4$)BF$_4$ and the voltage of oxidation side is impressed. At this time, an oxidation peak of polymer is observed at 1.6V against Ag$^+$/Ag, after that the polymer film becomes insoluble in solvent. It is well-known that the alomatic compound causes coupling reaction (formula 1) by electrode oxidation [for example, refer to New Polymer Experiment Vol.3, "Synthesis and Reaction of Polymer" 334 page (Kyoritsu Shuppan, 1996)].

By the bridging reaction of schema 10 mentioned below, the insolubirizing is caused.

schema 10

By this insolubirization, the color of the polymer film is changed to black. When the reduction side voltage is impressed to this black colored film, the reduction peaks appear at 0.85V and −1.4V against Ag$^+$/Ag, and at the each step, the color of polymer film is changed to brown, yellow. That is, it can be used as an elecrochromic unit.

Example 8
Film Shape Carbon Material

Polymers of P1/9 and P2/8-3 are dissolved in tetrahydrofuran, said solution is divided to 4 parts and dropped on a glassy carbon substrate of 14 mm×14 mm by four times and a cast film is prepared. The obtained film is vacuumed in a desiccator and dried in the room temperature. The weight of the polymer film of P1/9 and P2/8-3 measured from weight increasing are respectively 29.7 mg and 23.1 mg.

These films are heated by elevating the temperature to 1000° C. by 1° C. /min temperature elevating rate and maintaining 1000° C. for 1 hour. Then the temperature is cooled down to the room temperature by 2° C./min temperature cooling rate. This is a previous calcination process. As the main calcinations process, the film is heated to 1200° C. by 1° C./min temperature elevating rate under argon gas flow, then the temperature is elevated to 3000° C. by 5° C./min temperature elevating rate and maintain this temperature for 30 minutes. After that, the temperature is cooled down to 1200° C. by 10° C./min temperature cooling speed, further cooled down naturally. In both P1/9 and P2/8-3 cases, a graphitizated carbon thin film can be obtained.

INDUSTRIAL APPLICABILITY

As mentioned above, polyphenylene co-condensed polymer has a possibility to be formed from solution, and can provide the expected function and effect for the formation of an electrochromic of fluorescent body, as a forming material for carbonized film material and as a blue color emission fluorescent material.

What is claimed is:

1. A polymer compound substantially comprising of an unsubstituted paraphenylene group and an unsubstituted metaphenylene group, wherein the ratio of the metaphenylene group to the polymer compound is from 60 to 95%.

2. The polymer compound of claim 1, wherein said polymer compound is soluble in organic solvent.

3. The polymer compound of claim 1, wherein the molecular weight of said polymer compound is in the limit of from 600 to 40000.

4. The polymer compound of claim 2, wherein the molecular weight of said polymer compound is in the limit of from 600 to 40000.

* * * * *